Dec. 6, 1966    J. DUCHARME    3,290,019
LIQUID FUEL AND AIR MIXING DEVICE FOR
INTERNAL COMBUSTION ENGINE

Filed April 24, 1964    3 Sheets-Sheet 1

INVENTOR
Jean DUCHARME
BY

ATTORNEYS

INVENTOR
Jean DUCHARME
BY
ATTORNEYS

Dec. 6, 1966    J. DUCHARME    3,290,019
LIQUID FUEL AND AIR MIXING DEVICE FOR
INTERNAL COMBUSTION ENGINE

Filed April 24, 1964    3 Sheets-Sheet 3

INVENTOR
Jean DUCHARME
BY

ATTORNEYS

United States Patent Office 3,290,019
Patented Dec. 6, 1966

3,290,019
LIQUID FUEL AND AIR MIXING DEVICE FOR
INTERNAL COMBUSTION ENGINE
Jean Ducharme, 136 Notre Dame, St. Pie de Bagot,
Bagot, Quebec, Canada
Filed Apr. 24, 1964, Ser. No. 362,269
5 Claims. (Cl. 261—23)

The instant invention relates to a novel mixing device for mixing a liquid fuel, such as gasoline, and air and for use with internal combustion engines.

A primary object of the invention is to provide a device whereby a certain amount of air is thoroughly mixed with incoming fuel such as gasoline before it is admitted as a spray in the throttling section of a carburator in order to afford better and fuller combustion of the fuel.

Another object of the invention consists in providing a device of the above type wherein the above-mentioned air which is mixed with incoming liquid fuel is derived from the space, in the liquid fuel reservoir, above the liquid body whereby to recuperate any evaporated and gaseous gasoline which forms above the said liquid fuel body thus providing a further economic advantage to the user.

An overall object of the invention is therefore to economize fuel as much as possible both by ensuring thorough mixture of the fuel and air and also by recuperating vaporized gasoline which forms above the gasoline body in the fuel reservoir of the carburator.

It is believed that a better understanding of the invention will be afforded by the description that follows of two different embodiments of the invention, the description having reference to the appended drawing, wherein.

Figure 1:
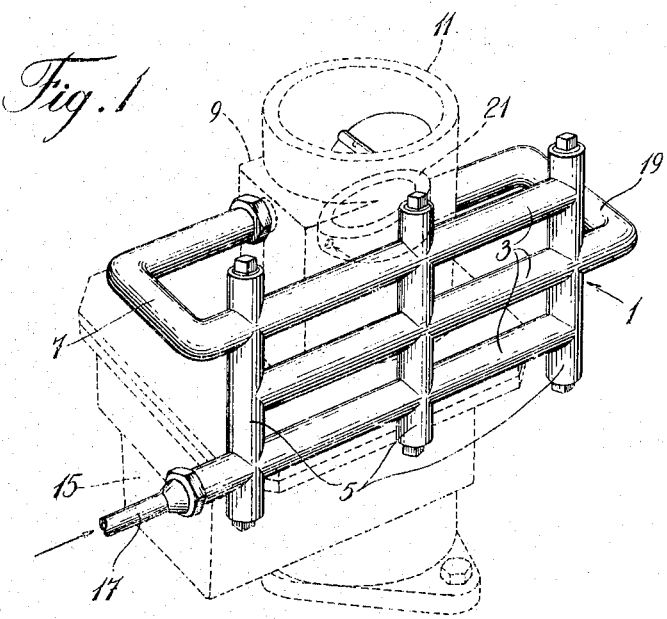
FIG. 1 is a perspective view of a first embodiment of the invention, shown in full lines, and mounted on a carburator of standard type, drawn in dotted lines.

Generally and as illustrated in the drawing, the invention resides in the provision of a liquid fuel and air mixing device for an internal combustion engine, which device comprises a network of interconnected tubes; an air inlet and a liquid fuel inlet at one end of said network, and an air and fuel mixture outlet at the other end of said network.

The mixing device is for mounting on a carburator of standard type whereby the air inlet and the liquid fuel inlet are respectively connected to the space above the liquid fuel body in the caburator reservoir and directly into the said liquid body.

Figure 2:
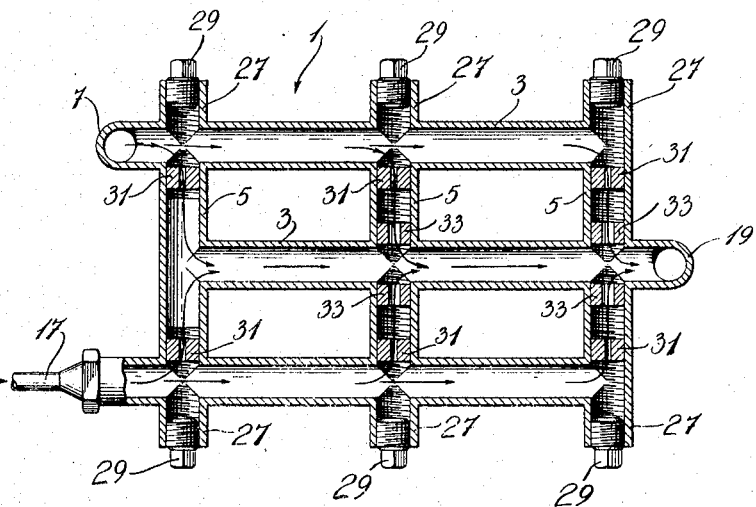
FIG. 2 is a vertical cross-sectional view of the mixing device of FIG. 1.

The network 1 of interconnected tubes is formed of a first group of parallel straight tubes 3 and a second group of parallel straight tubes 5 crossing the straight tubes 3 of the first group; all tubes 3 and 5 being interconnected in such a manner as to communicate with one another as clearly illustrated in FIG. 2.

Figure 3:
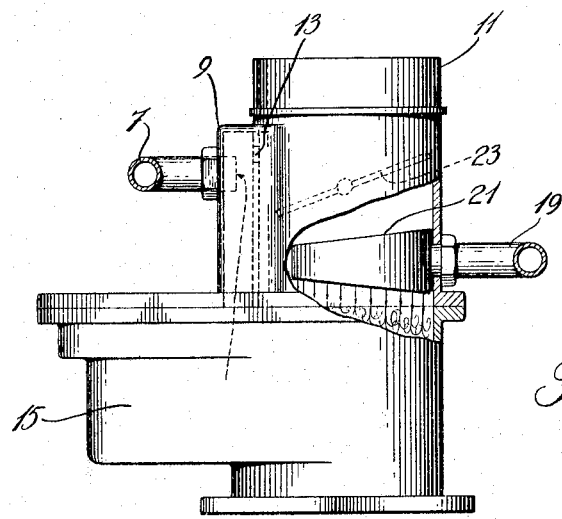
FIG. 3 is a perspective view of a standard carburator, partially cut away to illustrate the mounting of a spraying or discharge nozzle conceived in accordance with the invention.
Figure 4:
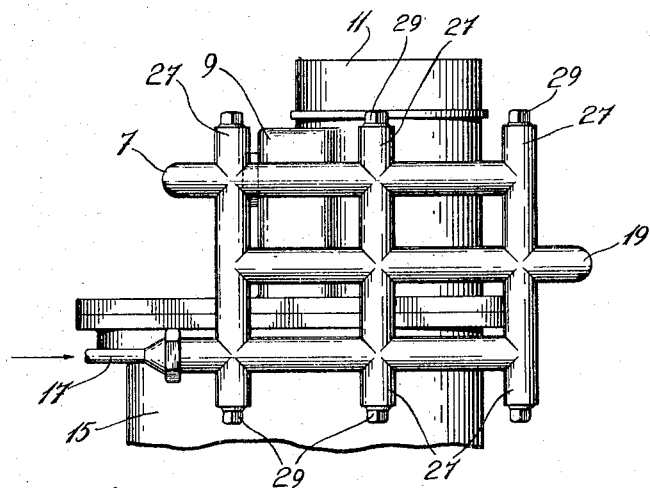
FIG. 4 is a side elevation view of the mixing device of the invention as shown mounted on a partially illustrated carburator.

The mixing device has an air inlet tube 7 generally connected to the upper one of straight tubes 3, at one end, and having the other end thereof connected to a venting box 9 generally provided on the side of the throttling section 11 of a standard carburator. As is known, the venting box 9 (which is incidentally separate from the throttling section and is only in communication therewith through a venting hole 13, shown in FIG. 3) is in direct communication with the space above the liquid fuel body in reservoir 15 (FIG. 3).

A liquid fuel inlet tube 17 is also provided which joins the lower portion of network 1, at the same end as air inlet tube 7, to reservoir 15 to open in the liquid fuel body in the reservoir.

In will thus be understood that inlets 7 and 17 are connected, respectively, one above and one into the fuel liquid body. Thus, inlet tube 7 picks up not only any air which may seep through the venting or hole 13 but most important any gasoline vapour which may have formed above the liquid fuel body.

An outlet tube 19 interconnects the network 1, preferably at mid height as illustrated in FIGS. 1 and 2 to a spraying nozzle 21 mounted in the throttling section 11 below a throttling valve 23, preferably of the butterfly type. As its name implies, the mixture outlet tube serves for the discharge of the mixture of air, vapour and liquid fuel into the carburator throttling section 11 through the spraying nozzle 21.

The inner section of the mixing device is best illustrated in FIG. 2 wherein it will be seen that the transverse straight tubes are provided, at each end thereof, with cleaning nipples 27 adapted to be closed by threaded plugs 29.

Not only are cleaning nipples 27 inwardly threaded but the complete bores of the two branch tubes 5 nearest outlet tube 19 are threaded whereas the first branch 5, nearest inlets 7 and 17 need only be partially threaded.

The purpose of the above-mentioned threading in straight tubes 5 is to receive a plurality of apertured plugs, 31 for the plugs nearer the outer straight tubes 3 and 33 for the apertured plugs nearer the tube 3 located at the center of the network 1. The difference between plugs 31 and 33 lies in that the latter have a central aperture having a greater diameter than the former.

With the above arrangement, when the engine speed is low and the vacuum consequently low, air and liquid fuel through inlets 7 and 17 are drawn in but because of the greater resistance through the two tubes 5 nearer outlet 19, the two fluids will be admitted through the straight tube 5 nearer the inlets 7 and 17 on account of the lesser resistance due to the presence of only two apertured plugs 31. As the speed of the engine and the vacuum created in the throttling section 11 increase, a certain amount of air-vapour from inlet 7 and liquid fuel from inlet 17 will be admitted through the central branch 5 and at still greater speed, some of the said fluid will be also admitted through tube 5 standing nearest outlet 19. Thus, the degree of mixing of the air, vapour and liquid fuel becomes greater as the speed of the engine increases.

Figure 5:
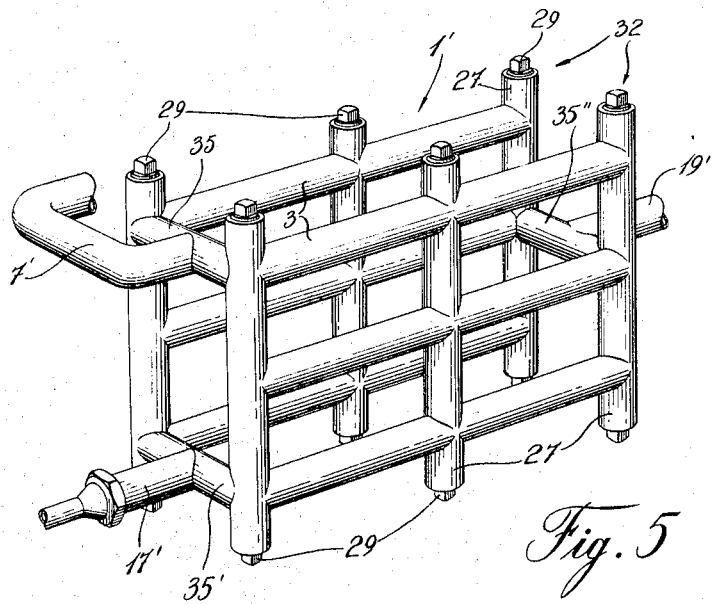
FIG. 5 is a perspective view of a second embodiment of the invention, per se.

In the embodiment illustrated in FIG. 5, the network 1' comprises two identical branches 33 each formed in a manner similar to the network 1 of FIG. 1.

In this embodiment, the air and gasoline vapour inlet means is formed of the inlet tube 7' communicating with a transverse tube 35 joining the two branches 33 together at the top whereas the liquid fuel inlet means comprises an inlet tube 17' which is likewise connected to a transverse tube 35 joining the two branches 33 at the lower end thereof. It will be understood that the other ends of inlet tubes 7' and 17' are connected in a manner identical to that illustrated in FIG. 1 and described above.

Likewise, the mixture outlet means of this embodiment is formed of a mixture outlet tube 19 which is connected to a transverse tube 35″ joining the two branches 33, centrally thereof, and at the end of the network opposite that of inlets 7' and 17'.

Figure 6:
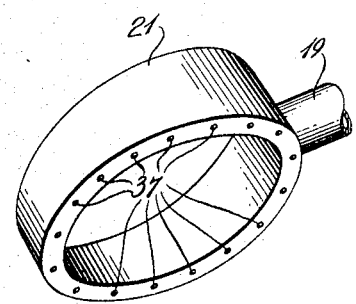
FIG. 6 is a perspective view of the spraying nozzle of the invention.

Another structural feature of the invention lies in the provision of the spraying nozzle 21 connected at the end of the mixture outlet tube 19 or 19' and illustrated in FIG. 6. It will be seen that nozzle 21 is formed as an annular enclosure having a radial wall through which extend a series of atomizing holes 37 spaced circumferentially there around. As best illustrated in FIG. 3, nozzle 21 is mounted inside the throttling section 11 whereby atomized liquid fuel, vapour and air are projected in section 11 around the periphery thereof. It will be noted that nozzle 21 is mounted below the butterfly valve 23.

Although specific embodiments of the invention have just been described, it will be understood that the invention is not to be limited thereby and should only be construed from the appended claims.

I claim:

1. A liquid fuel and air mixing device for an internal combustion engine having a carburator provided with a generally tubular throttling section into which a throttling valve is operatively mounted and a partially filled fuel reservoir, said device comprising:
   (a) a network of criss-cross interconnected tubes, said network having opposed ends;
   (b) an air inlet, at one end of said network, connected to said reservoir, above the fuel therein;
   (c) a liquid fuel inlet, at the said one end of said network and separate from said air inlet, connected to said reservoir into said fuel, and
   (d) an air and liquid fuel mixture outlet at the other end of said network and connected to said carburator to open below said throttling valve.

2. A liquid fuel and air mixing device for an internal combustion engine having a carburator provided with a generally tubular throttling section into which a throttling valve is operatively mounted and a partially filled fuel reservoir, said device comprising:
   (a) a network of interconnected tubes formed of a first group of parallel straight tubes and a second group of parallel straight tubes crossing said first group; the tubes of said first group communicating with those of the second group and the axes of all said tubes lying in a common plane;
   (b) an air inlet and a liquid fuel inlet, separate from said air inlet, at one end of said network and connected to two tubes of said first group;
   (c) an air and fuel mixture outlet at the other end of said network; said outlet being connected to a tube of said first group located between the tubes to which said air and fuel inlets are connected;
   (d) said air and liquid fuel inlets being respectively connected to the space above the liquid fuel in said reservoir and into said fuel, and
   (e) said mixture outlet being connected to said carburator to open below said throttling valve.

3. A liquid fuel and air mixing device for an internal combustion engine having a carburator provided with a generally tubular throttling section into which a throttling valve is operatively mounted and a partially filled fuel reservoir, said device comprising:
   (a) a network of interconnected tubes composed of two parallel branches each formed of:
      a first group of parallel straight tubes and a second group of parallel straight tubes crossing said first group; the tubes of said first group communicating with those of the second group as they cross each other and the axes of all said tubes lying in a common plane;
   (b) air inlet means and liquid fuel inlet means, separate from said air inlet means, at one end of said network connected to two different tubes of the first group of each branch;
   (c) air and fuel mixture outlet means at the other end of said network; said outlet means being connected to a tube of the first group of each branch located between the tubes to which said air and fuel inlet means are connected, and
   (d) said air inlet means and said fuel inlet means being connected to said carburator to open respectively above and into the liquid fuel in said reservoir and said mixture outlet being connected to said carburator, below said throttle valve.

4. A device as claimed in claim 3, wherein said mixture outlet means includes a mixture atomizing nozzle having discharge openings directed below and away from said throttle valve.

5. A device as claimed in claim 4, wherein said atomizing nozzle is a ring-like hollow member, the general plane of which is normal to the axis of said tubular throttling section.

References Cited by the Examiner

UNITED STATES PATENTS

| | | | |
|---|---|---|---|
| 47,258 | 4/1865 | Irwin et al. | 261—20 |
| 113,317 | 4/1871 | Lutkewitte | 261—23 |
| 743,416 | 11/1903 | Anderson | 261—75 X |
| 1,319,274 | 10/1919 | Foster | 261—21 |
| 1,639,621 | 8/1927 | Weaver | 261—65 X |
| 1,668,104 | 5/1928 | Colwell | 261—23 |
| 2,026,798 | 1/1936 | Pogue. | |
| 2,122,076 | 5/1938 | Voorhees | 261—75 X |
| 2,810,561 | 10/1957 | Rosenthal | 261—65 |

HARRY B. THORNTON, *Primary Examiner.*

T. R. MILES, *Assistant Examiner.*